United States Patent [19]

Herold et al.

[11] Patent Number: 5,191,321
[45] Date of Patent: Mar. 2, 1993

[54] SINGLE CELL BIMOS ELECTROLUMINESCENT DISPLAY DRIVER

[75] Inventors: Barry W. Herold, Boca Raton; Kevin Mclaughlin, Lake Worth, both of Fla.

[73] Assignee: Motorola, Inc., Schaumburg, Ill.

[21] Appl. No.: 520,894

[22] Filed: May 9, 1990

[51] Int. Cl.⁵ .............................................. G09G 3/30
[52] U.S. Cl. .................................. 340/781; 340/825.44; 307/570
[58] Field of Search ........................... 340/781, 825.44; 350/345; 307/495, 296.1, 296.7, 570; 315/307

[56] References Cited

U.S. PATENT DOCUMENTS

| | | | |
|---|---|---|---|
| 4,274,014 | 6/1981 | Schade, Jr. | 307/296.7 |
| 4,553,048 | 11/1985 | Bynum et al. | 307/296.1 |
| 4,633,141 | 12/1986 | Weber | 340/781 |
| 4,636,665 | 1/1987 | McLaughlin | 307/495 |
| 4,652,932 | 3/1987 | Miyajima et al. | 350/345 |
| 4,695,594 | 6/1987 | Reinke | 307/296.7 |
| 4,865,425 | 9/1989 | Kobayashi et al. | 350/345 |
| 4,904,889 | 2/1990 | Chieli | 307/570 |
| 4,916,338 | 4/1990 | Metz | 307/495 |
| 4,943,737 | 7/1990 | Guo et al. | 307/296.7 |
| 4,975,692 | 12/1990 | Tateyama | 340/781 |
| 4,975,694 | 12/1990 | McLaughlin et al. | 340/825.44 |
| 4,994,694 | 2/1991 | Gross | 307/495 |

Primary Examiner—Ulysses Weldon
Assistant Examiner—M. Fatahiyar
Attorney, Agent, or Firm—Gregg E. Rasor; William E. Koch; Thomas G. Berry

[57] ABSTRACT

A low power, dual mode BIMOS circuit generates a required drive voltage for illuminating an electroluminescent display panel from a low voltage, preferably a single cell. The BIMOS circuit comprises at least one bipolar transistor, at least one MOS transistor, an output voltage sensor, and a controller operating in a complementary fashion to disable a first clock signal coupled to the at least one bipolar transistor subsequent to enabling operation of the at least one MOS transistor for controlling the charging current used to generate the output voltage.

6 Claims, 2 Drawing Sheets

SINGLE CELL BIMOS ELECTROLUMINESCENT DISPLAY DRIVER

FIELD OF THE INVENTION

This invention relates in general to information display illumination circuits and more particularly to a low power high efficiency BIMOS display illumination circuit.

BACKGROUND OF THE INVENTION

Information display illumination for direct or backlighting purposes is well known to those skilled in the art. Conventional information display devices such as a liquid crystal display require the presence of a light source in order to provide contrast which makes the display readable. When in high ambient lighting conditions such as sunlight, the liquid crystal display requires no additional illumination source in order to provide sufficient contrast.

However, in low ambient lighting conditions, display illumination is accomplished in conventional information display devices by the use of incandescent bulbs or electroluminescent display panels. Incandescent bulbs, when used as a means for display backlighting, yield significant undesirable bright spots in the areas of the display near their physical locations. Many attempts have been made to uniformly diffuse the light emitted from incandescent sources to provide a more consistent illumination of the information display area. The present trend in electronic information display devices is to use electroluminescent display panels as backlighting devices. When used as a backlighting illumination device, the electroluminescent display panel solves the problems of bright spots associated with the use of incandescent bulbs as backlighting devices. With electroluminescent display panels, designers now have an excellent means of providing a uniform illumination for backlighting a liquid crystal display when viewed in low ambient lighting conditions.

However, electroluminescent display panels are not without their problems. The most significant problem facing the design engineer after selecting the electroluminescent display panel for illumination of an information display is the high drive voltage required to effectively illuminate an electroluminescent display panel. Typical electroluminescent display panels require from 90 to 140 volts peak to peak applied across the electrodes of the display panel. In a portable device having an information display, conventional low power bipolar technologies used in most present integrated circuits are not capable of efficiently producing voltages in the ranges in the ranges mentioned from a single 1.5 volt energy source.

Thus, what is needed is a BIMOS circuit capable of generating the required drive voltage for an electroluminescent display panel from a low voltage, preferably a single cell having a DC voltage of approximately 1.5 volts.

SUMMARY OF THE INVENTION

Accordingly, it is an object of the present invention to provide an improved electroluminescent display driving device with optimal power conversion efficiency.

In carrying out the above and other objects of the invention in one form, there is provided a BIMOS circuit comprising at least one MOS transistor for providing an output voltage and at least one bipolar transistor for enabling the MOS transistor, the bipolar transistor being disabled subsequent to the MOS transistor being enabled.

DETAILED DESCRIPTION OF THE INVENTION

Figure 1:
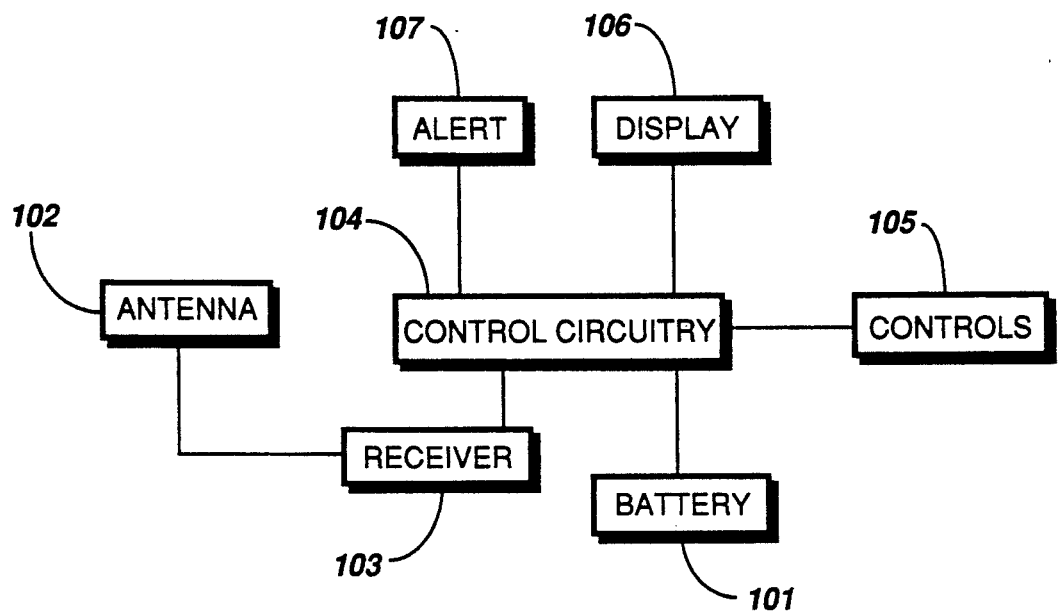
FIG. 1 is a block diagram of a selective call information display receiver.

Referring to FIG. 1, a battery 101 powered selective call receiver operates to receive a signal via an antenna 102. The received signal is routed from the antenna 102 to the receiver 103. The receiver 103 demodulates the received signals using conventional techniques and forwards the demodulated signal to the control circuitry 104, which decodes and recovers information contained within the received signal. In accordance with the recovered information and user controls 105, the selective call receiver present at least a portion of the information, such as by a liquid crystal display 106, and signals the user via a sensible alert 107 that a message has been received. The user then views the information presented on the display 106 which is appropriately illuminated according to ambient lighting conditions. When in low ambient lighting conditions, the receiver systems control circuitry 104 can automatically enable backlighting of the display 106 in response to a predetermined level of ambient light detected. The display may also be illuminated by a user's manual intervention with the controls 105 which is then sensed by the control circuitry 104 illuminating the display 106.

It is advantageous and cost effective from the user's point of view to design the receiver system such that the battery 101 is a AA or AAA style which is readily available at their corner drug store. This allows the user to easily purchase and replace the battery 101 when a low cell condition is detected by the control circuitry 104.

The control circuitry 104 shown in FIG. 1, may include, but is not restricted to, the following elements (not shown): signal multiplexing integrated circuits, a microcomputer, a digital memory coupled to the microcomputer, environmental sensing circuitry such as for light or temperature conditions, audio power amplifier circuitry, control interface circuitry, and display illumination driver circuitry. These elements are arranged in a manner which when assembled provides the display information receiver as requested by the customer.

Figure 2:
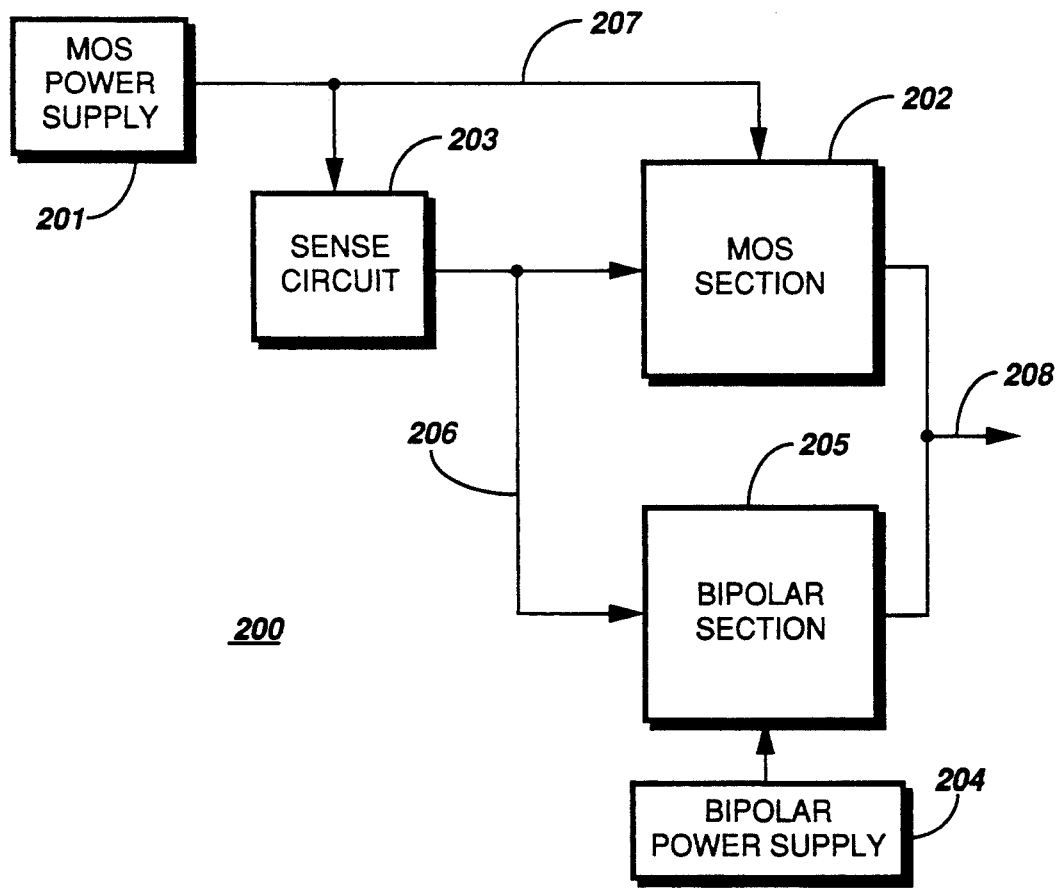
FIG. 2 is a block diagram of the BIMOS integrated circuit system in accordance with the preferred embodiment.

Referring to FIG. 2, a variable MOS power supply 201 provides bias to the MOS section 202 and the MOS power supply sense circuit 203. The bipolar power supply 204 provides bias for the bipolar system 205 and can be used to generate the MOS power supply 201. When power is initially applied to the system 200, the circuitry in the MOS section 202 cannot operate because the MOS power supply 201 does not provide a high enough voltage, the voltage being denoted as $V_{DD}$, to overcome the physical threshold of the MOS devices. In a first state during a first time period, the sense circuitry 203 provides a signal 206 that disables the MOS section 202 and enables the bipolar section 205. Once the MOS power supply 201 voltage $V_{DD}$ has reached a predetermined threshold, the signal 206 from the sense circuitry 203 changes level, initiating a second state and beginning a second time period in which the bipolar section 205 circuitry is disabled and the MOS section 202 circuitry is enabled. Note that the output of the MOS section 202 and the bipolar section 205 are coupled together, thus producing a continuous output signal 208 before and after the transition occurs from the bipolar section 205 to the MOS section 202. The sense circuitry 203 can be a conventional comparator where the reference value is substantially equal to the value of voltage $V_{DD}$ required to power the MOS section 202. When the output of the MOS power supply 201 reaches the voltage $V_{DD}$, the comparator's output changes from a first to a second level, thus controlling the MOS 202 and bipolar 205 sections, respectively. This configuration insures that the MOS section 202 will not operate until the voltage $V_{DD}$ from the MOS power supply 201 has reached a magnitude sufficient to properly power the MOS section 202.

Figure 3:
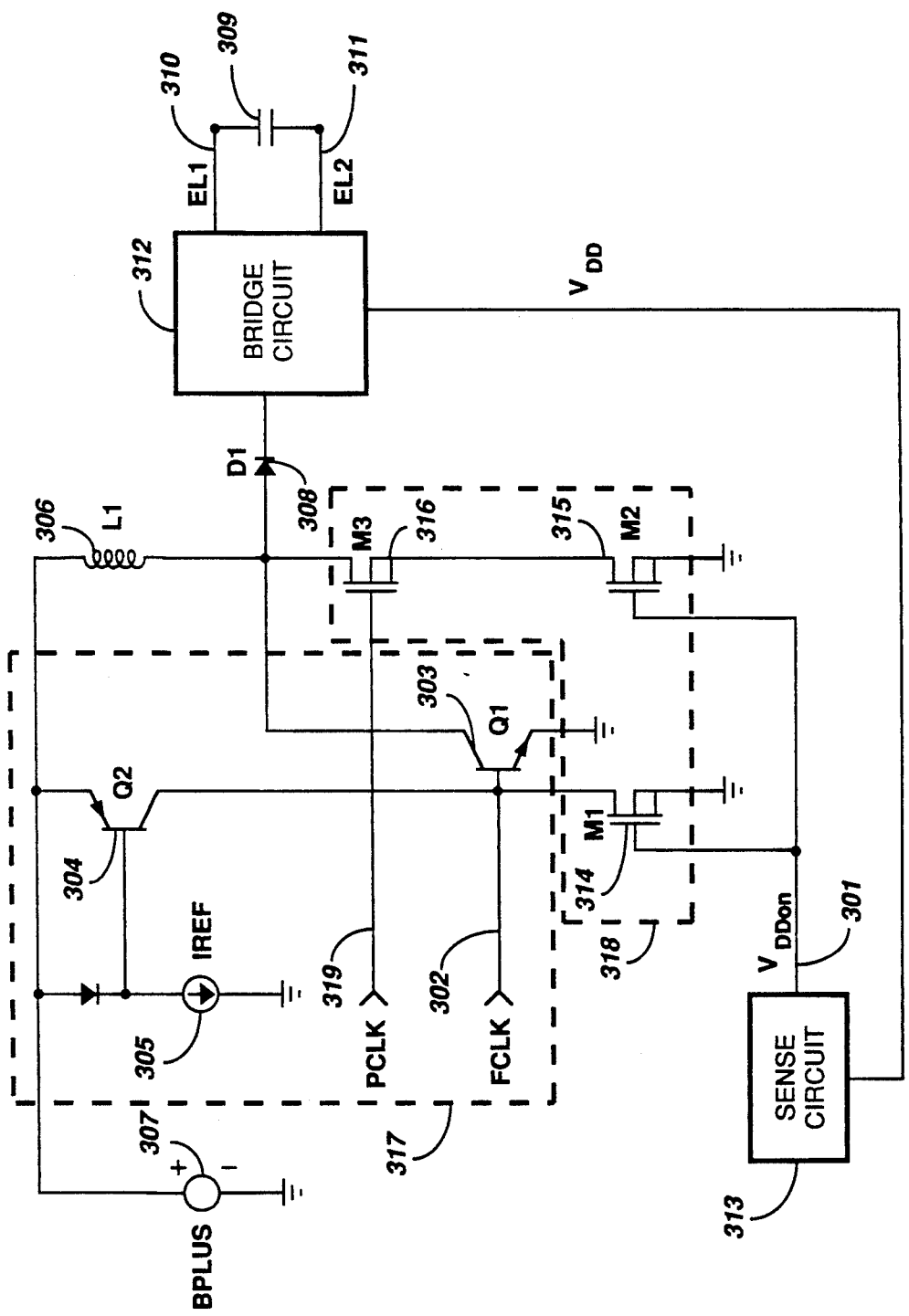
FIG. 3 is a schematic diagram of the BIMOS electroluminescent display driver circuit.

Referring to FIG. 3, during the startup phase and in a first time period, the bipolar means 317 comprising transistor Q1 303, transistor Q2 304, and current source IREF 305, is enabled by the first sensing means comprising a sense circuit 313 for determining when an output voltage from the BIMOS electroluminescent display driver has reached a first predetermined value, the output voltage being the voltage $V_{DD}$ generated internal to the bridge circuit 312. Until voltage $V_{DD}$ has reached a magnitude sufficient to power the MOS devices or other associated MOS circuitry, the signal $V_{DDon}$ 301 is held low (false). Initially, the signal $V_{DDon}$ 301 is low (false) and a clock signal FCLK 302 having a frequency of 32 KHz for example, is applied at the base of transistor Q1 303. Transistor Q2 304 acts as a current source mirroring the current of IREF 305 and providing a pull-up for the base of transistor Q1 303 during the absence of a signal at the base of transistor Q1 303. During the high portion of the signal FCLK 302, the coil L1 306, which is coupled to the radio's BPLUS 307 (main power supply or battery), is grounded through the collector emitter junction of transistor Q1 303. This action induces a current in the coil L1 306 that is directed through diode D1 308 upon release of the base current applied to transistor Q1 303 by FCLK 302. The current directed through diode D1 308 is coupled to the electroluminescent display panel 309 via the bridge circuit 312 and through the terminal EL1 310. Terminal EL2 311, connected to the electroluminescent display panel 309, is grounded by the bridge circuit 312. Since an electroluminescent display panel as an electronic load physically resembles a capacitor 309, the current will act to charge the capacitor to a voltage equal to the initial electroluminescent display panel voltage plus the product of the time duration and magnitude of the current pulse divided by the capacitance of the electroluminescent display panel. When this procedure is repeated successively, the charge on the capacitor or electroluminescent display panel 309, increases and a corresponding increase in voltage is noted when measured across terminals EL1 310 and EL2 311 of the electroluminescent display panel 309. The voltage present at terminal EL1 310 is sensed by high voltage limiting circuitry (not shown) internal to the bridge circuit 312 as well as by the sense circuit 313, and when the voltage reaches the predetermined threshold for $V_{DD}$ which is approximately 5 volts in magnitude, the sense circuit 313 forces the signal $V_{DDon}$ 301 high (true) and in response enables the first control means which enables and disables the MOS means 318 comprising MOS devices M1 314, M2 315, and M3 316 and the bipolar means 317, respectively, in a complementary fashion. The signal $V_{DDon}$ 301 when true turns on N channel MOS devices M1 314 and M2 315. This action begins a second time period in which the bipolar means 317 is disabled and the MOS means 318 is enabled. MOS device M1 314 grounds the base of transistor Q1 303 disabling the 32 KHz clock at its input. MOS device M2 315 grounds the source of MOS device M3 316, thus enabling the application of a clock signal PCLK 319 having, for example, a frequency of 8 KHz, to the gate of MOS device M3 316, which in turn grounds the coil L1 306 at an 8 KHz rate providing current pulses through diode D1 308 to the electroluminescent display panel 309 for further charging. When the electroluminescent display panel's 309 voltage has reached a predetermined magnitude as sensed a by second sensing means comprising high voltage limiting circuitry (not shown) internal to the bridge circuit 312, a second control means responsive to the second sensing means selects the direction of charge delivery to the electroluminescent display panel. In selecting the direction of charge delivery to the electroluminescent display panel, terminal EL1 310 is grounded and terminal EL2 311 is connected in series with diode D1 308. The switching of terminals EL1 310 and EL2 311 is accomplished through the use of a conventional bridge configuration (not shown) within the bridge circuit 312 and the process described before for the charging of the electroluminescent display panel 309 is repeated in the opposite direction, thus producing a voltage magnitude difference approximately equal to twice the predetermined threshold for the maximum voltage applied the electroluminescent display panel 309 in a single direction. By example, if the single sided charging threshold is set to be 70 volts above a reference potential, when the bridge circuit 312 switches and the electroluminescent display panel 309 is charged in the reverse direction, the measured peak to peak voltage across the electroluminescent display panel terminals EL1 310 end EL2 311 will be equal to two times seventy volts or 140 volts peak to peak.

Another advantage realized by using BIMOS technology is that when the circuit is constructed using strictly bipolar devices, the device geometries, isolation, and performance specifications required significantly increase the complexity and cost of the design. By using of MOS devices in the high voltage sections, their self-isolating design in terms of adjacent integrated circuit structures yields a significant performance advantage. Identical or similar circuits cannot be constructed using low power bipolar technology which operate with an input voltage substantially equal to 1.5 volts and produce and output voltage above forty volts peak to peak. This invention makes use of the low operating current and voltage requirements of bipolar devices in the startup region or portion of the operational sequence while developing the MOS power supply voltage from the electroluminescent display panel supply voltage. As the transition region is crossed where the bipolar circuitry is shutdown and the MOS circuitry takes over generating the electroluminescent display panel voltage, the use of MOS devices requiring little or no gate current optimizes the total efficiency of power conversion in the system and extends useful life of the receiver's power source.

We claim:

1. A BIMOS circuit comprising:
   at least one bipolar transistor operating during a first time period and responsive to a first clock signal having a first frequency, the at least one bipolar transistor controlling a charging current used to generate an output voltage during the first time period:
   sensing means for determining a start of a second time period, the start of the second time period corresponding to the output voltage reaching at least a minimum voltage at which a MOA transistor is operational:
   at least one MOS transistor operating during the second time period and responsive to a second clock signal having a second frequency, the at least one MOS transistor controlling the charging current used to generate the output voltage during the second time period, the second frequency being substantially less than the first frequency; and
   control means responsive to the sensing means, the control means operating in a complementary fashion to disable the first clock signal coupled to the at least one bipolar transistor subsequent to enabling operation of the at least one MOS transistor for controlling the charging current used to generate the output voltage 2. The BIMOS circuit according to claim 1 wherein the at lest one bipolar transistor is powered by an input voltage having a magnitude less than the output voltage.

3. The BIMOS circuit according to claim 1 wherein a MOS power supply voltage has a magnitude corresponding to at least the minimum voltage at which a MOS transistor is operational, the MOS power supply voltage being derived from the output voltage.

4. The BIMOS circuit according to claim 1 wherein the output voltage is coupled to an electroluminescent display panel and provides operational power thereto.

5. A selective call radio receiver system having an information display and a power source for providing power to the selective call radio receiver system, the selective call radio receiver system comprising:
   a receiver that demodulates a received signal using conventional techniques and forwards the demodulated received signal to control circuitry that decodes and recovers information contained within the demodulated received signal and presents at least a portion of the information using an information display;
   a BIMOS electroluminescent display driver having a bipolar section and a MOS section;
   an electroluminescent display for backlighting the information display that is powered by the BIMOS electroluminescent display driver, the BIMOS electroluminescent display driver comprising:
   at least one bipolar transistor in the bipolar section operating during a first time period and responsive to a first clock signal having a first frequency, the at least one bipolar transistor controlling a charging current used to generate an output voltage from the BIMOS electroluminescent display driver during the first time period:
   sensing means for determining a start of a second time period, the start of the second time period corresponding to the output voltage from the BIMOS electroluminescent display driver during the first time period:
   sensing means for determining a start of a second time period, the start of the second time period corresponding to the output voltage from the BIMOS electroluminescent display driver reaching at least a minimum voltage at which a MOS transistor is operational, the second time period being subsequent to the first time period;
   at least one MOS transistor in the MOS section operating during the second time period and responsive to a second clock signal having a second frequency, the at least one MOS transistor controlling the charging current used to generate the output voltage from the BIMOS electroluminescent display driver during the second time period, the second frequency being substantially less than the first frequency; and
   control means responsive to the sensing means, the control means operating in a complementary fashion to disable the first clock signal coupled to the at least one bipolar transistor subsequent to enabling operation of the at least one MOS transistor for controlling the charging current used to generate the output voltage from the BIMOS electroluminescent display driver; and
   means for determining when the output voltage from the BIMOS electroluminescent display driver has reached a second predetermined value and in response to the output voltage from the BIMOS electroluminescent display driver reaching the second predetermined value reversing a direction of charge delivery to the electroluminescent display panel.

6. The selective call radio receiver system according to claim 5 wherein the bipolar section is powered by an input voltage having a magnitude less than the output voltage.

* * * * *

UNITED STATES PATENT AND TRADEMARK OFFICE
CERTIFICATE OF CORRECTION

PATENT NO. : 5,191,321

DATED : March 2, 1993

INVENTOR(S) : Herold et al.

It is certified that error appears in the above-identified patent and that said Letters Patent is hereby corrected as shown below:

Column 5, line 15, please delete "MOA" and insert --MOS--.

Signed and Sealed this

Twenty-second Day of March, 1994

*Attest:*

BRUCE LEHMAN

*Attesting Officer*   *Commissioner of Patents and Trademarks*